US012752734B2

(12) United States Patent
Hirsch et al.

(10) Patent No.: US 12,752,734 B2
(45) Date of Patent: Oct. 6, 2026

(54) ASSEMBLY FOR A SEATBELT RETRACTOR, AND SEATBELT RETRACTOR

(71) Applicant: ZF AUTOMOTIVE GERMANY GMBH, Alfdorf (DE)

(72) Inventors: Johann Hirsch, Alfdorf (DE); Alexander Steidle, Heubach (DE)

(73) Assignee: ZF AUTOMOTIVE GERMANY GMBH, Alfdorf (DE)

(*) Notice: Subject to any disclaimer, the term of this patent is extended or adjusted under 35 U.S.C. 154(b) by 306 days.

(21) Appl. No.: 18/579,371

(22) PCT Filed: Jul. 12, 2022

(86) PCT No.: PCT/EP2022/069453
§ 371 (c)(1),
(2) Date: Jan. 15, 2024

(87) PCT Pub. No.: WO2023/285456
PCT Pub. Date: Jan. 19, 2023

(65) Prior Publication Data

US 2024/0336221 A1 Oct. 10, 2024

(30) Foreign Application Priority Data

Jul. 16, 2021 (DE) .................... 10 2021 118 420.7

(51) Int. Cl.
*B60R 22/40* (2006.01)

(52) U.S. Cl.
CPC ........ *B60R 22/40* (2013.01); *B60R 2022/401* (2013.01)

(58) Field of Classification Search
CPC .......................... B60R 22/40; B60R 2022/401
See application file for complete search history.

(56) References Cited

U.S. PATENT DOCUMENTS 9,409,547 B2 * 8/2016 Baumgartner .......... B60R 22/48
9,499,123 B2 * 11/2016 Siebeck .................. B60R 22/36
9,950,690 B2 * 4/2018 Hodatsu .................. B60R 22/40
(Continued)

FOREIGN PATENT DOCUMENTS

DE 102017203417 A1 9/2018
DE 102017106787 A1 10/2018
(Continued)

OTHER PUBLICATIONS

PCT International Search Report for corresponding International Application Serial No. PCT/EP2022/069453, mailed Nov. 14, 2022, pp. 1-4.

*Primary Examiner* — Sang K Kim
(74) *Attorney, Agent, or Firm* — Tarolli, Sundheim, Covell & Tummino LLP

(57) ABSTRACT

An assembly (18) for a belt retractor of a vehicle comprises a holding fixture (34) and a vehicle-sensitive sensor (32) arranged in the holding fixture (34) for activation of a locking mechanism (16) of the belt retractor. The sensor (32) comprises a sensor housing (50) and an inertia body (52) suspended in the sensor housing (50). A spherical holding space (44) via which the sensor housing (50) is positioned in the holding fixture (34) so that the sensor (32) is movable only relative to one positioning axis (48) is formed in the holding fixture (34).

15 Claims, 5 Drawing Sheets

(56) References Cited

U.S. PATENT DOCUMENTS

Figure 1:
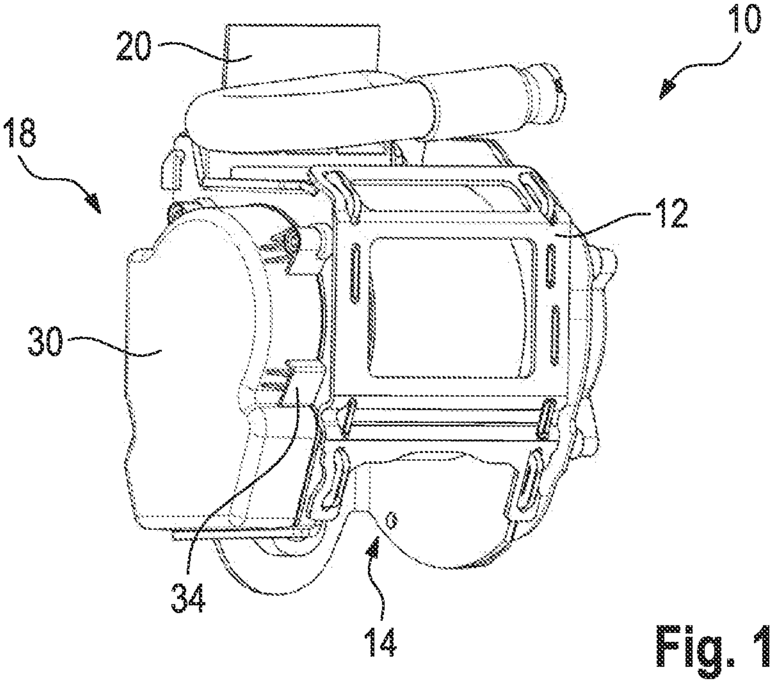

| | | | | |
|---|---|---|---|---|
| 10,464,522 | B2 * | 11/2019 | Schmidt | B60R 22/40 |
| 11,135,999 | B2 * | 10/2021 | Hirsch | B60R 22/405 |
| 2009/0033084 | A1 | 2/2009 | Sorensen et al. | |

FOREIGN PATENT DOCUMENTS

| | | | |
|---|---|---|---|
| DE | 102017126987 | A1 | 5/2019 |
| EP | 0631911 | A1 | 1/1995 |
| EP | 1091212 | A1 | 8/2006 |
| JP | 2009274613 | A | 11/2009 |
| WO | 2012/159731 | A1 | 11/2012 |

* cited by examiner

ASSEMBLY FOR A SEATBELT RETRACTOR, AND SEATBELT RETRACTOR

RELATED APPLICATIONS

This application is a U.S. National Stage Application filed under 35 USC 371 claiming priority to Serial No. PCT/EP2022/069453, filed on 12 Jul. 2022; which claims priority from German Patent Application 10 2021 118 420.7, filed 16 Jul. 2021, the entireties of which are hereby incorporated herein by reference.

The invention relates to an assembly for a belt retractor and to a belt retractor comprising such assembly.

An assembly of this type comprises a holding fixture in which a vehicle-sensitive sensor for activation of a locking mechanism of the belt retractor is arranged. In the case of positive or negative vehicle acceleration and starting from a specific inclined position of the vehicle, an inertia body starts to move and results in pivoting of a sensor lever. Said movement causes a pawl to be actuated which can activate a blocking mechanism on the belt retractor in various ways. The blocking mechanism then prevents webbing from being extracted from the belt retractor.

The sensors must adopt a particular position on the belt retractor, i.e., a particular position relative to the longitudinal and transverse directions of the automotive vehicle so that corresponding acceleration of the vehicle which generally has a component in the longitudinal direction and in the transverse direction of the vehicle can be reliably detected.

For this purpose, from EP 2 714 475 B1 a ball sensor is known, for example, which can be arranged at different orientations in a holding fixture.

However, ball sensors have a comparatively high noise emission when the vehicle is moved over a track with rough underground or when the vehicle vibrates. Vehicle occupants find these noise emissions disturbing.

For this reason, suspended sensors (so-called oscillating sensors) the inertia body of which can be pivoted about exactly one stationary point of rotation were developed. Such a sensor is known, for example, from DE 10 2017 126 987 A1.

Said suspended sensors require not to be deflected in the rest position. So far this has been achieved by an appropriate design of the belt retractor.

Therefore, it is the object of the invention to facilitate the arrangement of a suspended sensor on a belt retractor.

The object is achieved by an assembly for a belt retractor of a vehicle. The assembly includes a holding fixture and a vehicle-sensitive sensor arranged in the holding fixture for the activation of a locking mechanism of the belt retractor. The sensor includes a sensor housing and an inertia body suspended in the sensor housing. In the holding fixture, a cylindrical holding space is formed via which the sensor housing is positioned in the holding fixture in such a way that the sensor is movable only relative to a positioning axis.

In addition, the object of the invention is achieved by a belt retractor for a seatbelt of a vehicle. The belt retractor has a belt reel, a locking mechanism and an above-described assembly. Accordingly, the holding fixture is positioned with the sensor fixed in position on a frame of the belt retractor and the sensor is configured to actuate the locking mechanism.

The invention is based on the fundamental idea that the suspended inertia body is movable, and more precisely rotatable, in two directions inside the sensor body. Hence, the sensor has to be oriented only relative to one direction so that it can detect an acceleration of the vehicle. In this way, oscillating sensors can be used in belt retractors in a very flexible manner, and a larger positioning clearance of belt retractors is created inside the vehicle interior or at a vehicle seat. The assembly helps facilitate the arrangement of the oscillating sensor in two ways. On the one hand, fewer configurations of the holding fixture are required, as the arrangement of the sensor inside the holding fixture is variable. On the other hand, the arrangement is improved as compared to the known ball sensors to the effect that the sensor is movable only with respect to one axis.

For example, the sensor is welded with the holding fixture as soon as its position is defined in the holding fixture. In this case, the sensor is then fixed in position in the holding fixture. In this way, the sensor can be easily adjusted to the orientation of the belt retractor in a seat.

A bearing space can be formed in the sensor housing so that the inertia body received in a low-wear manner and the sensor has a long service life.

In one configuration of the invention, the inertia body includes a bearing section which is supported in the bearing space. Thus, a fixed pivot point is defined for the inertia body.

For example, the bearing section is spherical.

In order to reduce the noise produced by the movement of the bearing section in the bearing space, the bearing space may have at least one extension which delimits the movability of the bearing section in the bearing space in one direction.

In other words, the bearing section and, thus, the inertia body are movable, and more precisely rotatable, in two directions only.

For example, the extension acts directly on the bearing section and is a bulge inside the bearing space.

The bearing space can include also more than one extension, such as two, three or four extensions. The extensions then are advantageously distributed symmetrically around the bearing section. In this way, the bearing section is received in a more stable manner in the bearing space.

The bearing space can have a filling opening through which a lubricant can be introduced housing spatially between the bearing space and the bearing section from outside of the sensor. The lubricant serves for dampening the inertia body. In addition, the lubricant reduces the friction between the inertia body and the bearing, which has an advantageous effect on the service life of the sensor.

The lubricant is, for example, a solid lubricant such as grease or the like.

Advantageously, the at least one extension delimits the movement of the bearing section in the direction of the filling opening. Thus, at first the inertia body can be secured to the sensor and subsequently lubricant can be introduced between the bearing section and the bearing space.

It is conceivable that a lubricant reservoir is formed in the bearing space, specifically between the filling opening and the extension. The lubricant reservoir can help provide a sufficiently large amount of lubricant in the bearing of the sensor to dampen noise particularly reliably and in the long run. In particular, the lubricant provided in the lubricant reservoir serves as supply which can spread within the bearing, when part of the lubricant has been displaced already from the bearing due to frequent movement of the inertia body.

In one configuration, the filling opening is sealed by a closure that can be released without tools. It is thus possible to easily introduce lubricant.

Accordingly, the closure can be formed integrally with at least part of the sensor housing. In this way, the closure is captively attached to the housing.

The sensor housing is formed in two parts, for example, and the closure is formed on one of the two housing halves.

The closure may be a film hinge. This enables the closure to be designed in a particularly simple manner on the housing.

The sensor housing may have a positioning contour on the outside. Via said positioning contour, the sensor housing and, thus, the sensor are fixed in three spatial directions in the holding fixture and are movable about the positioning axis only.

The positioning contour is a groove, for example.

The groove may be formed at the transition of the housing halves.

It is conceivable that a positioning device which acts on the positioning contour and fixes the sensor housing in three spatial directions so that the sensor is movable about the positioning axis only is provided in the cylindrical holding space.

Accordingly, the sensor can be movable over a specific angular range, such as about +25° and −25° based on a zero position of the sensor in the positioning device.

In one configuration of the invention, the sensor has a two-arm sensor lever which is pivotably mounted on the sensor housing by means of a bearing pin. A first sensor lever arm is associated with the inertia body, and a weight is arranged on a second sensor lever arm. A rest position of the sensor lever is defined by the weight. More precisely, the weight force of the weight acts on the second sensor lever arm so that the sensor is biased into its rest position. In this way, the locking mechanism can be deactivated again, if the amount of acceleration falls below a specific value. Said amount of acceleration is determined by the position of the weight on the second sensor lever arm and the mass of the weight.

In order to provide an inexpensive and compact sensor lever, the sensor lever can be made of plastic and the weight can be made of a metal or a metal alloy. The weight is injected into the second sensor lever or is separately mounted, for example.

For example, the weight is spherical and is made of an iron alloy such as steel.

To enable direct force transmission of the inertia body to the sensor lever, the inertia body may have an indentation which is in direct contact with a section of the first sensor lever arm.

In one configuration of the invention, the locking mechanism is a three-arm lever. Accordingly, a lever arm is in contact with the first sensor lever arm and is pivotable by the sensor lever arm from a first position into a second position. In the second position, a second lever arm of the locking mechanism interacts directly or indirectly with the belt reel and blocks the rotation of the belt reel in one direction.

For example, the first sensor lever arm is in the form of a pawl and acts on locking teeth of the belt reel.

Figure 2:
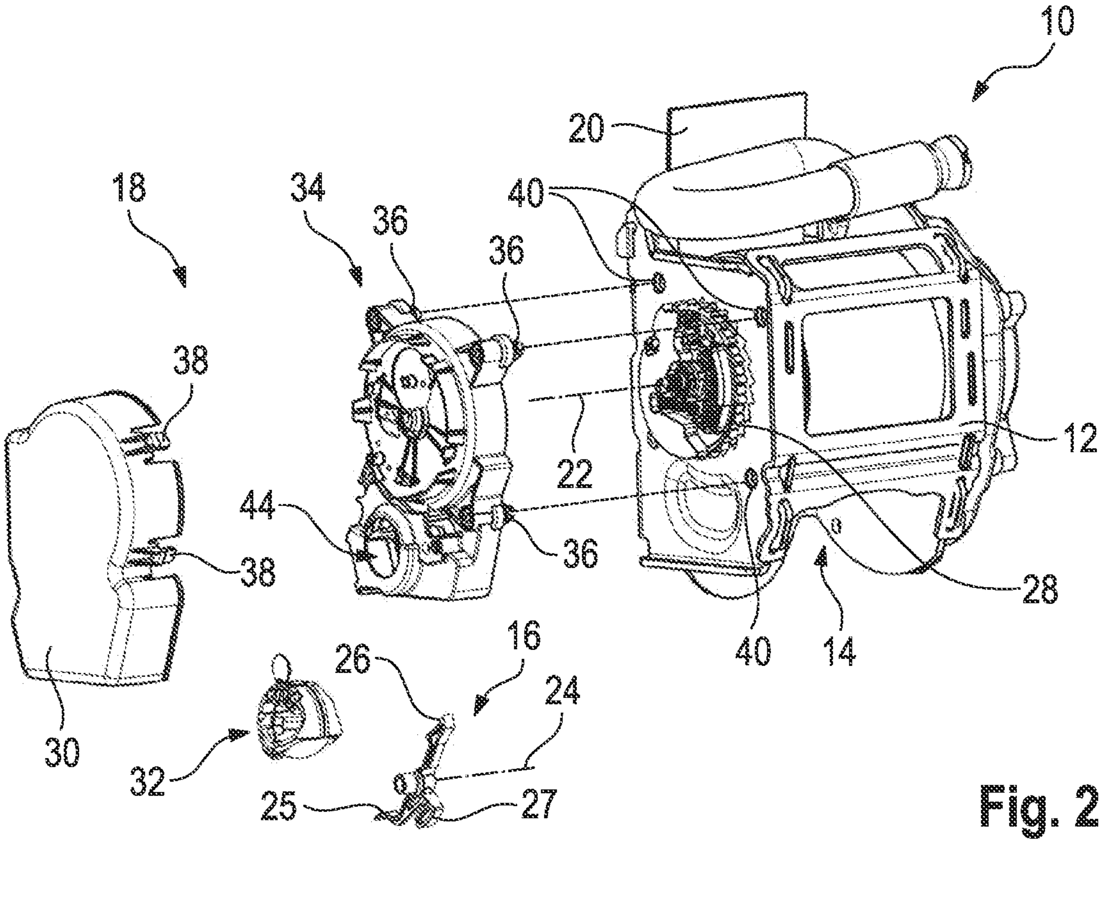
Figure 3:
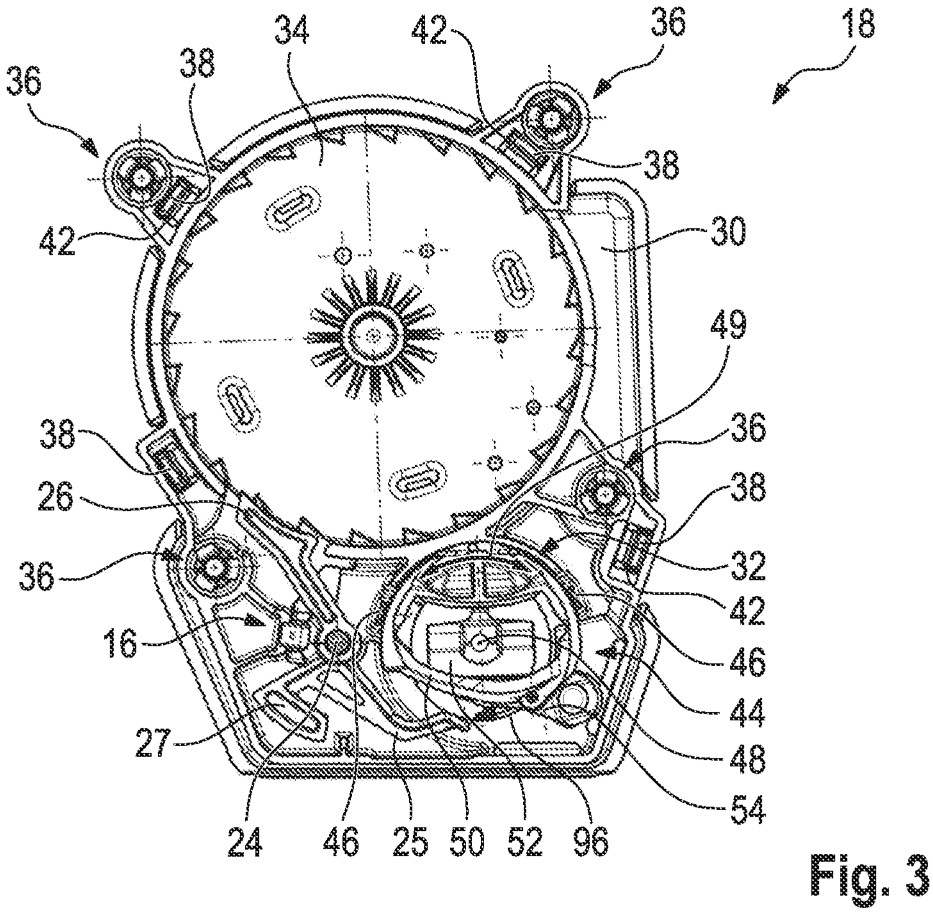
Figure 4:
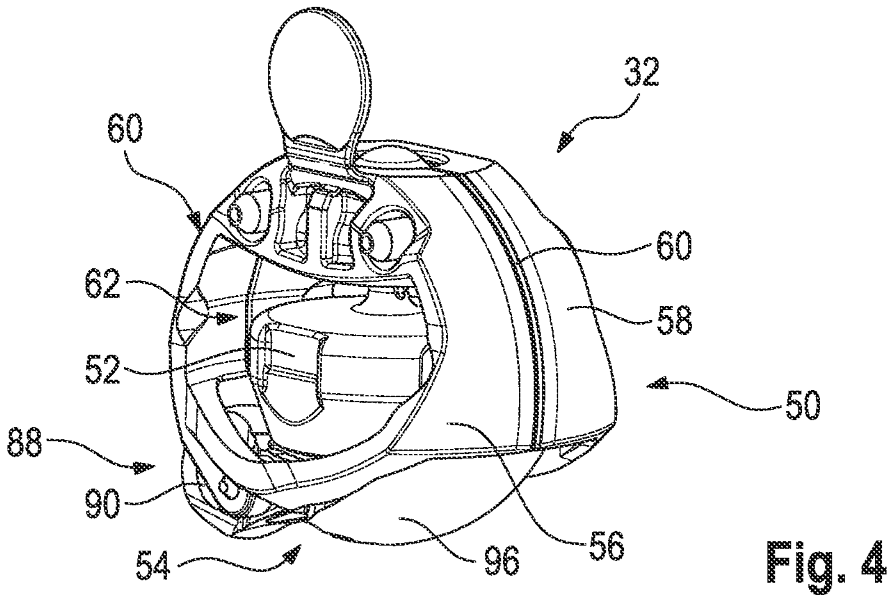
Figure 5:
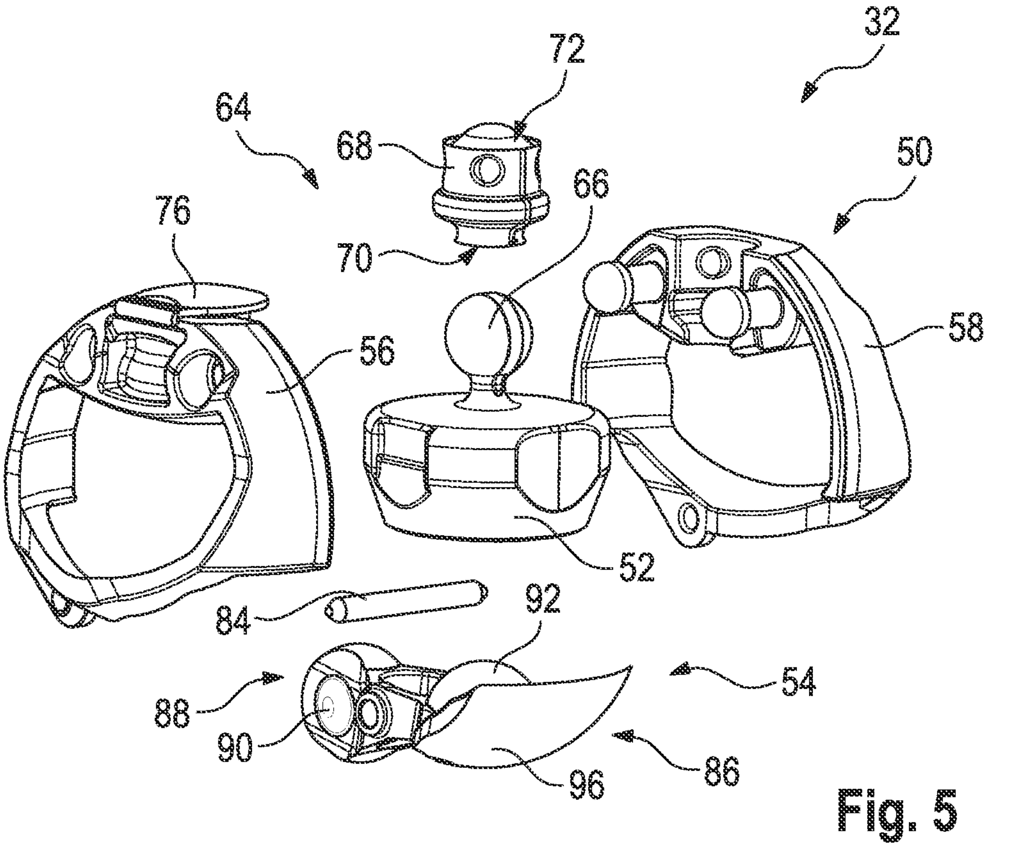
Figure 6:
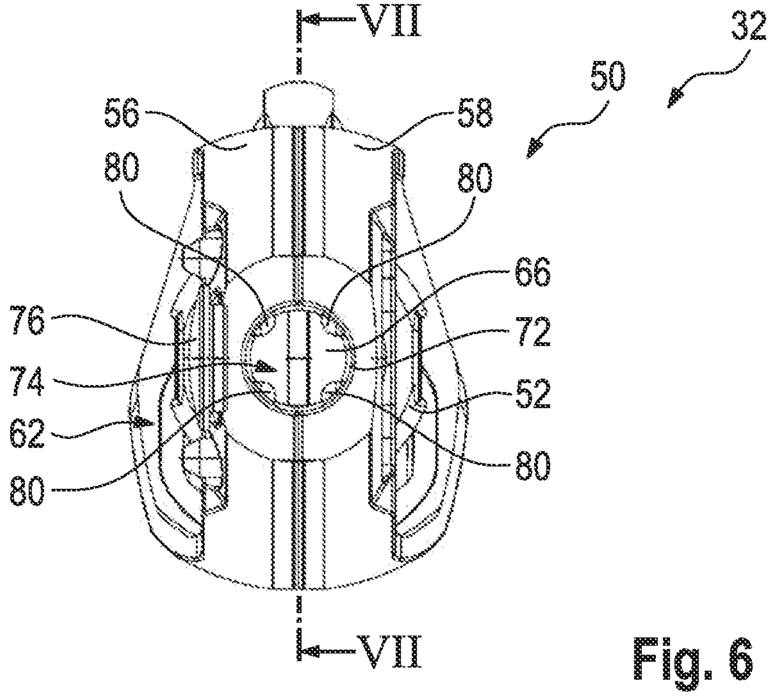
Figure 7:
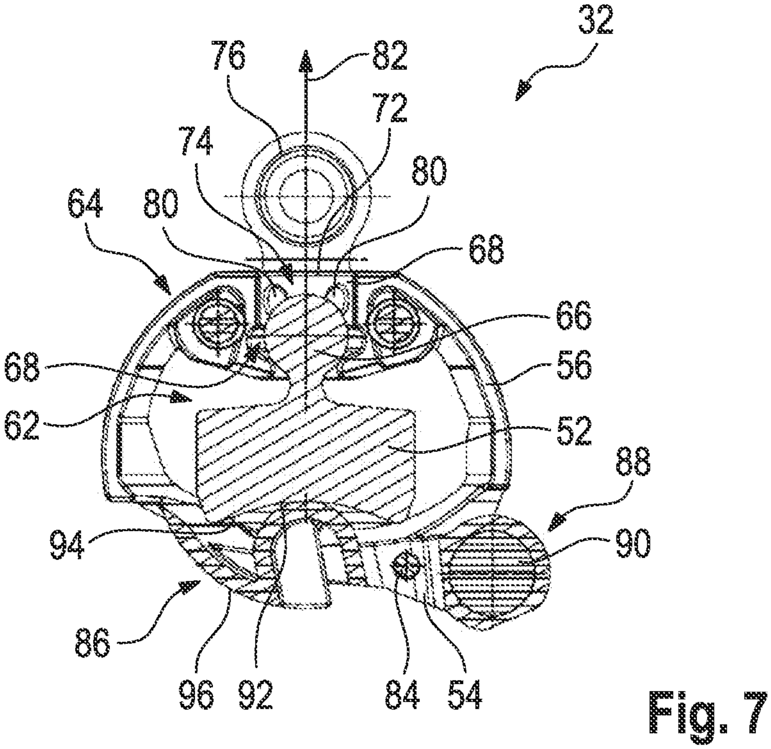
Figure 8:
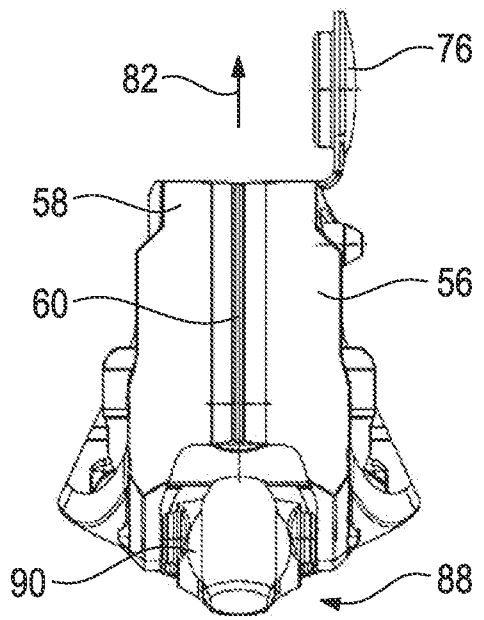
Figure 9:
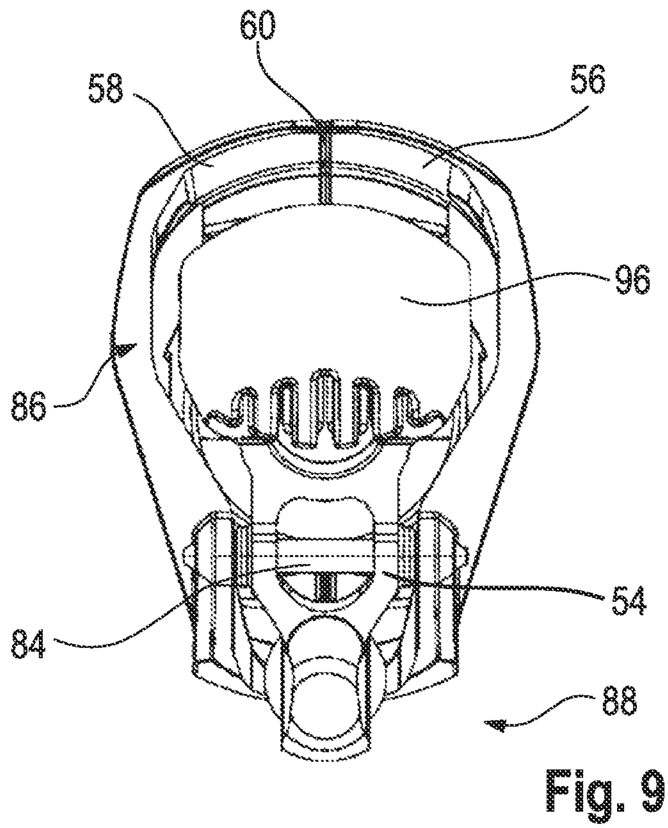

Further features and advantages of the invention will be evident from the following description and from the attached drawings which will be referred to in the following, and wherein:

FIG. 1 shows a perspective view of a belt retractor according to the invention comprising an assembly according to the invention, FIG. 2 shows an exploded view of the belt retractor and the assembly of FIG. 1, FIG. 3 shows a top view of the assembly of FIGS. 1 and 2, FIG. 4 shows a sensor of the assembly of FIG. 3 in a perspective view, FIG. 5 shows an exploded view of the sensor of FIG. 3, FIG. 6 shows a top view of the sensor of FIGS. 3 and 4, FIG. 7 shows a sectional view of the sensor along the section line VII-VII in FIG. 6, FIG. 8 shows the sensor of FIGS. 4 to 7 in a lateral view, and FIG. 9 shows a bottom view of the sensor of FIGS. 4 to 8.

FIGS. 1 and 2 illustrate a belt retractor 10 comprising a frame 12, a belt reel 14 supported on the frame 12, a locking mechanism 16 and an assembly 18 which is mounted on the frame 12.

A webbing 20 which can be wound onto and off the belt reel 14 by rotation of the belt reel 14 about an axis 22 is wound on the belt reel 14.

The locking mechanism 16 is in the form of a three-arm lever and is pivotable about a pivot axis 24.

In other words, the locking mechanism 16 includes three lever arms 25, 26, 27, that is an actuating arm 25, a pawl 26 and a wing arm 27.

The locking mechanism 16 is movable between a first position (release position) and a second position (blocking position). The wing arm 27 is designed so that the locking mechanism 16 is pivoted into the first position without actuation at the actuating arm 25.

In the release position (FIG. 3), the webbing 20 can be wound onto and off the belt reel 14, and in the blocking position the pawl 26 engages in locking teeth 28 which are coupled to the belt reel 14 via a spring mechanism. A blocking mechanism which blocks extension of the webbing 20, i.e., rotation of the belt reel 14 about the axis 22, is released on the belt reel 14 by the pawl 26 engaging in the locking teeth 28.

The assembly 18 comprises a cover 30, a sensor 32 and a holding fixture 34.

The assembly 18 is mounted on the frame 12 of the belt retractor 10 via the holding fixture 34 and the cover 30 is mounted on the holding fixture 34.

Accordingly, both the holding fixture 34 and the cover 30 include corresponding detent hooks 36, 38 through which the holding fixture 34 is mounted on the assembly 18 and, resp., the cover 30 is mounted on the holding fixture 34 without the use of tools.

More precisely, the holding fixture 34 is fastened in openings 40 of the frame 12 and the cover 30 is fastened in openings 42 (FIG. 3) of the holding fixture 34.

The holding fixture 34 includes a cylindrical holding space 44 in which the sensor 32 is disposed.

Adjacent to the holding space 44, positioning devices 46 through which the sensor 32 is positioned inside the holding fixture 34 are formed on the holding fixture 34.

More precisely, by the positioning device 46 the sensor 32 is fixed in the three spatial directions but can still be rotated about a positioning axis 48.

Hence, the sensor 32 can still be moved, as indicated by the arrow 49, in two directions about the positioning axis 48.

Accordingly, the movement is limited in both directions in the illustrated embodiment. The sensor 32 can be moved only in the range from −25° to +25° from the zero position of the sensor 32 shown in the Figure.

It is also generally conceivable that the sensor 32 can be moved in a range from −45° to +45° relative to the illustrated zero position.

After positioning the sensor 32 in the holding fixture 34, the sensor 32 is fixed in position in the holding fixture 34, such as by welding with the positioning device 46.

The structure of the sensor 32 becomes clear from the FIGS. 4 to 9.

The sensor 32 comprises a sensor housing 50, an inertia body 52 suspended, particularly pivot-mounted, inside the sensor housing 50, and a sensor lever 54.

Consequently, the sensor 32 is in the form of an oscillating sensor.

In the illustrated embodiment, the sensor housing 50 is a two-part plastic housing having a first housing half 56 and a second housing half 58 (FIG. 4). The housing halves 56, 58 can be mounted to each other without tools.

Positioning contours 60, which are exemplified as grooves, are formed at the transition from the first housing half 56 to the second housing half 58.

Each positioning contour 60 is associated with a corresponding positioning device 46 of the holding fixture 34.

In other words, the positioning device 46 acts on the positioning contour 60 of the sensor housing 50 and, in so doing, fixes the sensor housing 50 in the three spatial directions (as above-described).

The sensor housing 50 is designed to be at least partially open in the area of the sensor lever 54 and in a pivoting area 62 of the inertia body 52 so that the pivoting area 62 available for the inertia body 52 is defined by the sensor housing 50.

More precisely, the inertia body 52 is suspended in the sensor housing 50 and is thus pivotable about a stationary pivot point.

In other words, the sensor 32 has a bearing 64 that receives a bearing section 66 formed on the inertia body 52. A bearing space 68 is formed between the bearing section 66 and the sensor housing 50.

The bearing space 68 comprises two openings 70, 72, that is an opening 70 through which the inertia body 52 extends and a filling opening 72 via which lubricant can be introduced to the bearing 64, specifically using a nozzle.

The area between the bearing section 66 and the filling opening 72 in the bearing space 68 serves as lubricant reservoir 74 which receives an excess of lubricant.

As illustrated in FIG. 6, the filling opening 72 can be closed without tools via a closure 76.

In the illustrated embodiment, the closure 76 is formed by a film hinge formed integrally with the first housing half 56 which is movable between an opened position (FIGS. 4 and 6) and a closed position (FIGS. 3 and 5).

In the closed position, the closure 76 seals the filling opening 72 so that no lubricant can leave the lubricant reservoir 74 on the filling opening.

As it is particularly clear from FIG. 7, a holding space 78 and extensions 80 are formed in the bearing space 68.

The holding space 78 is a peripheral groove and is used to absorb excess lubricant and to release it back to the bearing section 66.

In the illustrated embodiment, the extensions 80 are formed symmetrically in the area of the filling opening 72 and as a bulge in the interior of the bearing space 68.

Accordingly, the extensions 80 delimit the movement of the bearing section 66 in a direction 82 (FIG. 7) which points out of the filling opening 72.

Hence the extensions 80 prevent the bearing section 66 from moving in the direction of the closure 76 so that a fixed point of rotation is defined for the bearing section 66. In addition, noise caused by a movement of the bearing section 66 in the bearing space 68 is prevented in this way.

The sensor lever 54 is pivotally received on the sensor housing 50 via a bearing pin 84.

In the shown embodiment, the sensor lever 54 is a two-arm lever and, accordingly, includes a first sensor lever arm 86 and a second sensor lever arm 88.

In the second sensor lever arm 88 a weight 90 is disposed.

More precisely, the weight 90 is spherical and is injected into the second sensor lever arm. The weight 90 is made of a metal or a metal alloy.

For example, the weight 90 is a steel ball.

The first sensor lever arm 86 is associated with the inertia body 52 and has a contact section 92 through which the sensor lever arm 86 is in direct contact with the inertia body 52.

In the illustrated embodiment, the inertia body 52 includes, at the end remote from the bearing section 66, an indentation 94 in which the bulged contact section 92 of the sensor lever 54 is received.

On the side remote from the inertia body 52, the sensor lever arm 86 includes a shell-type transfer portion 96 which is in direct contact with the actuating arm 25 of the locking mechanism 16 (FIG. 3).

Accordingly, the transfer portion 96 has a large surface area via which the transfer portion 96 can act on the actuating arm 25. In this way, the locking mechanism 16 does not have to be adjusted to the position of the sensor 32 in the holding fixture 34. Instead, the large surface area of the transfer portion 96 ensures that the sensor 32 can actuate the locking mechanism 16 via the sensor lever 54 in any position in which it can be positioned in the holding fixture 34.

Correspondingly, a deflection of the inertia body 52 results in the indentation 94 acting on the contact section 92 and pressing the same downwards in the representation of FIG. 3. The downward movement causes the locking mechanism 16 to be actuated via the actuating arm 25 and to be moved from the shown release position into the blocking position in which the rotation of the belt reel 14 is blocked.

The assembly thus helps facilitate the arrangement of the sensor 32 on the belt retractor 10, as the position of the inertia body 52 on the belt retractor 10 can be adjusted very easily.

The invention claimed is:

1. An assembly for a belt retractor of a vehicle, comprising a holding fixture (34), and a vehicle-sensitive sensor (32) disposed in the holding fixture (34) for activation of a locking mechanism (16) of the belt retractor (10), wherein the sensor (32) includes a sensor housing (50) and an inertia body (52) suspended in the sensor housing (50), and wherein a cylindrical holding space (44) through which the sensor housing (50) is positioned in the holding fixture (34) so that the sensor (32) is movable only relative to one positioning axis (48) is formed in the holding fixture (34).

2. The assembly according to claim 1, wherein a bearing space (68) in which the inertia body (52) is supported in the sensor housing (50) is formed in the sensor housing (50).

3. The assembly according to claim 2, wherein the inertia body (52) includes a bearing section (66) which is supported in the bearing space (68).

4. The assembly according to claim 3, wherein the bearing space (68) has at least one extension (80) which delimits the movability of the bearing section (66) in the bearing space (68) in one direction (82).

5. The assembly according to claim 3, wherein the bearing section of the inertia body is spherical.

6. The assembly according to claim 1, wherein the bearing space (68) includes a filling opening (72) through which a lubricant can be introduced spatially between the bearing space (68) and the bearing section (66) from outside the sensor housing (50).

7. The assembly according to claim 6, wherein the filling opening (72) is sealed by a closure (76) that can be released without tools.

8. The assembly according to claim 7, wherein the closure is formed integrally with at least part of the sensor housing.

9. The assembly according to claim 1, wherein the sensor housing (50) has a positioning contour (60) on the outside, wherein the sensor housing is received in the spherical holding space (44) via the positioning contour (60).

10. The assembly according to claim 1, wherein the sensor (32) includes a two-arm sensor lever (54) which is pivotably mounted on the sensor housing (50) by means of a bearing pin (84), wherein a first sensor lever arm (86) is associated with the inertia body (52) and a weight (90) is arranged in the second sensor lever arm (88).

11. The assembly according to claim 10, wherein the sensor lever (54) is made of plastic and the weight (90) is made of a metal or a metal alloy, wherein the weight (90) is injected into or mounted in the second sensor lever arm (88).

12. The assembly according to claim 10, wherein the inertia body (52) has an indentation (94) which is in direct contact with a contact section (92) of the first sensor lever arm (86).

13. A belt retractor for a seatbelt of a vehicle comprising a belt reel (14), a locking mechanism (16) and an assembly (18) according to claim 1, wherein the holding fixture (34) is positioned with the sensor (32) at a fixed position on a frame (12) of the belt retractor (10) and the sensor (32) is configured to actuate the locking mechanism (16).

14. The belt retractor according to claim 13, wherein the locking mechanism (16) is a three-arm lever, wherein a lever arm (25) is in contact with the first sensor lever arm (86) and is pivotable by the sensor lever arm (86) from a first position into a second position, wherein a second lever arm (25) of the locking mechanism (16) in the second position interacts with the belt reel (14) and blocks the rotation of the belt reel (14) in one direction.

15. The assembly according to claim 1, wherein the sensor housing from which the inertia body is suspended is movable only relative to the one positioning axis.

* * * * *